United States Patent Office 2,707,201
Patented Apr. 26, 1955

2,707,201

POROUS STORAGE BATTERY SEPARATOR AND METHOD OF MAKING

Gordon H. Fernald, Addison, and Kenneth M. Enloe, North Lake Village, Ill., assignors to The Richardson Company, Lockland, Cincinnati, Ohio, a corporation of Ohio No Drawing. Application May 5, 1951,
Serial No. 224,844

10 Claims. (Cl. 136—146)

Our invention has to do with the provision of separators for electrical accumulators, and in particular, with the provision of low-cost resinous separators of high porosity.

In the copending application of Edward R. Dillehay (deceased) and Gordon H. Fernald (one of the inventors herein), entitled Storage Battery Separator and Method of Making It, Serial No. 43,767, filed August 11, 1948, there is described a storage battery separator and process wherein the essential constituents making up the ultimate structure consist of a thermoplastic resin and a thermosetting resin in admixture. In the exemplary embodiment of that application, the thermoplastic resin is a vinyl or vinyl copolymer resin or mixture thereof. The resinous substances in admixture (the thermosetting resin being, of course, initially in an incompletely polymerized condition) have incorporated in them a solvent, a wetting agent and a large quantity of substance which may be subsequently leached out of the mass to give the desired porosity. It has been found that in this way an initial composition may be formed which is neither too soft nor too brittle, and which may be sheeted out as by a calender or extrusion device, after which the sheeted stock may be heat treated to complete the polymerization of the thermosetting resin and then leached for the removal of the soluble substance. It is readily possible to make separators in this way without the use of thermosetting resins; but some dimensional instability is likely to be encountered in manufacture, and in use if such separators are used under conditions of extreme heat as, for example, in tropical or sub-tropical regions.

The principal objects of the present invention are the provision of improvements in the manufacture of separators of this general class; the provision of separators which are made exclusively of thermoplastic resinous substances, and the control of shrinkage in such separators.

These and other objects of the invention, which will be pointed out hereinafter or will be apparent to one skilled in the art upon reading these specifications, we accomplish in those procedures and in those separators of which we shall now describe certain exemplary embodiments.

The essential ingredients for making the separators are a suitable resinous base, an extender which is preferably a water insoluble substance, a solvent, a wetting agent capable of acting also as a plasticizer, and a major quantity of leachable substance in a fine state of subdivision.

The amount of leachable substance employed is very large in order to give the required porosity, being in the case of ordinary salt or sodium chloride more than four times the quantity of all of the other ingredients combined, by volume. In order to incorporate such a large quantity of leachable substance (hereinafter called filler), the resinous body must be considerably bulked, not only with a solvent, but with a plasticizer acting as an extender. A wetting agent, preferably one which is also an extender, helps the composition to go together, increases porosity to the extent that it is partially removed in the leaching operation, and the remainder makes the porosity of the ultimate separator effective in that the separator is readily penetrated by the storage battery electrolyte, even when the separator is immersed in the electrolyte in a dry condition. The agent used to impart porosity may be any organic or inorganic filler of suitable gravity and removable by a leaching treatment, preferably leachable with water. We may employ any soluble inorganic salt or mixtures thereof, such as ammonium sulfate, or potassium or sodium nitrate, which are readily and completely removable by leaching, and which do not react with the compound as such, as well as various organic substances which are leachable, such as sugar, urea crystals, and various soluble acetates, citrates and tartrates. Substances which require special solvents for leaching or removal entail additional expense, as will be evident, and are not generally preferable. Since the ultimate particle size of the filler as introduced into the composition has a substantial effect on porosity, we prefer a filler which is easily handled and easily reduced to fine particle size. Of the fillers which we may employ, the cheapest and most satisfactory is common salt, i. e. sodium chloride, which is not difficult to handle, is easily reduced to a fine particle size, is of assistance in retaining the water soluble wetting agent, as hereinafter described, and is readily recoverable if desired. In a storage battery separator the degree of porosity must be very high so that the separator has very little electrical resistance. At the same time, the individual pores or passageways must be exceedingly fine since otherwise chemical substances produced on or in the plates of a lead-acid type of accumulator will enter the pores of the separator and ultimately destroy its usefulness. In the fillers employed in our compositions, a fine particle size is useful not only in attaining the desired fineness of the pores or passageways in the ultimate separator, but also in the diminution of the leaching time. Particle sizes of about 40 microns (i. e. 200 mesh or smaller) are suitable.

It will be understood that different fillers have different specific gravities, and while the exemplary formulae hereinafter given deal with sodium chloride as a filler, with parts by weight, other fillers may be handled on a volume basis, or a calculation made based on specific gravity. We employ compositions of which (as compounded) the filler makes up from about 60% to about 85% of the total volume, depending on the physical properties desired. Less than about 60% of filler by volume is not likely to give sufficient porosity for storage battery use, while as the filler volume goes above about 85% it becomes increasingly difficult to make compositions which will hold together. The porosity contributed by the filler (when removed by leaching) is of course increased by removal of the solvent and a large portion of the extender-plasticizer. In general, our ultimate porosities range between substantially 60% and 90%; and for the most perfect separators we prefer to keep the porosity above 80%. Within the limits set forth it is possible to effect a satisfactory compromise between strength and porosity.

The extender-plasticizer should comprise or consist of a surface-active substance to facilitate extraction, and, remaining in part in the separator, to facilitate the wetting and penetration of the dry separator by the acid electrolyte especially in dry charged and dry-uncharged accumulators.

As wetting agents, those surface-active substances ordinarily classified as "ionics" have certain disadvantages. Cationic emulsifiers in general have a tendency to give a skin effect in the separators, while anionic emulsifiers in general have a tendency to impair the cohesion of the resinous mass. As wetting agents the "non-ionics" are satisfactory for our purpose, although some of them have little plasticizing action in themselves. Some non-ionics, such as those formed from peanut oils, produce a strength increase in the product but do not improve extraction time. Others, like those based on sperm oil, decrease extraction time but do not improve physical properties.

A material which is especially advantageous is the so-called "sulfonated red oil" (actually a sulfated oleic acid). This material is a superior plasticizer. It effects a very substantial decrease in extraction time; and the final physical qualities of the separator are substantially improved, there being more rigidity with less brittleness. The "sulfonated red oil" may be used alone as the plasticizer or it may be combined or used along with oils or other materials having a plasticizing or extending action. By way of example, we have found it advantageous to use from about .3 to .5 pounds of Dutrex-20 for each 3 pounds of resin in the product. Dutrex-20 is a high molecular weight aromatic petroleum extract.

Typical but non-limiting specifications for the "sulfonated red oil" are as follows:

| | | |
|---|---|---|
| Free fatty acid | percent | 36–41 |
| Water | do | 24–25 |
| Sulfate (organic) | do | 4.00–4.70 |
| Total alkalinity | mg. KOH per gram | 25–20 |
| Ash less than | percent | 10 |
| Iron less than | do | 0.02 |
| Manganese less than | do | .0002 |

It will be noted from the above that the sulfate content and total alkalinity vary inversely to each other, in other words within the limits set forth as the sulfate content varies from 4 to 4.7 the added alkali varies from 25 to 20 mg.

As to the solvent component of our initial mix, there are many organic solvents which may be employed. They should be sufficiently volatile to be expelled without decomposition under conditions of heat to which the composition will ultimately be subjected (about 350° F.), and they should be essentially inert as to the remainder of the ingredients of the composition. For example we may employ cyclohexanone, the methyl, amyl, butyl or propyl ketones and esters, butyl acetate, and the commercial Cellosolve solvents such as butyl Cellosolve, Cellosolve acetate and the like. Cellosolve acetate is perhaps least objectionable as to odor and toxicity. Furfural, the monomer, may also be employed as a solvent either alone or along with other materials.

Hitherto, and particularly in accordance with the teachings of the copending application, Serial No. 43,767, it has been found advisable to employ as the resinous base a mixture of thermoplastic and thermosetting resins. The thermoplastic resin makes up the greater part of the resinous ingredient by weight; but a substantial proportion of thermosetting resin which was cured or polymerized shortly after the composition was extruded, and prior to leaching, was found to prevent warping and shrinking. Nevertheless, there are certain disadvantages inherent in the use of a thermosetting resin component. Such a component acts to prevent dimensional changes by becoming completely polymerized subsequent to the extrusion of the separator-sheet as hereinafter explained and prior to the leaching treatment. This means that it must be readily polymerizable under permissible degrees of heat and in a short time, which in turn means, in practical effect, that it must contain a polymerization catalyst. The presence of catalyst (usually an acid or an alkali) not only renders the handling and storage of the incompletely polymerized thermosetting resin more difficult, but tends to corrode extrusion dies and mixing devices. A reduction in quantity of or elimination of the catalyst would require either longer times at higher temperatures or a treatment of the extruded separator sheet in alkaline or acid baths, all of which would increase the cost.

While it is perfectly possible to make separators without thermosetting resins which will give good service under most general conditions, since initial dimensional changes or shrinkage can be compensated for during manufacture, our object is to make a universal separator which can be relied upon for service under extreme conditions.

We have found that separators meeting such requirements can be made from thermoplastic resins as the sole binder while minimizing or avoiding dimensional changes such as warping and shrinking providing the resin has a high enough molecular weight and can be compounded by the application of heat and pressure in a closed system, formation taking place upon the ejection of the composition therefrom.

For most purposes the molecular weight of the resin is an index of the proper softening point, and we ordinarily employ in our work thermoplastic resins having a molecular weight of about twenty thousand or greater.

The thermoplastic resins we may employ include any that are acid resistant in nature. The various vinyl resins come under this heading, as well as numerous other ones including polyethylene, polystyrene and others. Mixtures of resins may often be employed with advantage, and a high molecular weight resin may be employed along with a resin of lower molecular weight.

By way of example, a vinyl resin having a molecular weight of 25,000 or higher will give no trouble with shrinkage at temperatures of use (in a storage battery) of 160° F. Higher molecular weights will resist dimensional change at still higher service temperatures. If the highest sustained temperature expected in use were about 150° F., a 20,000 molecular weight resin would be suitable. If the molecular weight is above about 28,000, the addition of a thermosetting resin is not feasible in any event; but for universal service thermoplastic resins having molecular weights of 25,000 and higher require no addition of thermosetting resin. It may be noted that a high molecular weight thermoplastic resin with a thermosetting component provides a substantially tougher and stiffer product.

A typical formula for a separator made in accordance with our invention, and free of the presence of thermosetting resins, is as follows:

| | Parts by weight |
|---|---|
| Thermoplastic resin (preferably pure polyvinyl chloride or the acetate copolymer of high molecular weight as set forth above) | 100 |
| Salt | 1000 |
| Dutrex-20 | 30 |
| Solvent (di-isobutyl-ketone, or any of the other solvents mentioned herein) | 100 |
| Sulfated red oil | 30 |

For compositions of this type we have had to develop a special compounding technique due to the high viscosity of the high molecular weight resin. As a first step all of the ingredients (the resin being in powdered form) are preferably put into an attrition mill such as the Sprout-Waldron mill in which a dry mix is formed. A cone blender or Muller mixer can be used instead. The mixed product is a powdery mass having a "dry" appearance because the quantities of liquid ingredients are not sufficient to cause it to agglomerate at room temperatures. The dry mix powder is next transferred to a compounder-extruder in which the material may be subjected to heat, pressure and mechanical working in an enclosed system in which the solvent is fully retained. A good example of the type of compounder-extruder suitable for this purpose is the mechanism manufactured by Welding Engineers Inc., and fully described in an article in the magazine "Modern Plastics" for June 1949. Variants of such a machine may be used. The essential effect is obtained in an extrusion machine having a propelling worm followed by a reverse worm or by restrictions to give back pressure and an intense masticating action without releasing the volatile constituents from the material. In the compounder-extruder, the dry mix is plasticized and homogenized in a closed system as explained, and after sufficient working is extruded from the device. The ultimate shape of the sheet from which the separators are to be cut is produced by a notched or ribbed die serving as the extrusion orifice for the compounder-extruder. Preferably though not necessarily, the composition is extruded in the form of a closed tube which is then slit, opened out into a sheet, and carried by a conveyor through a zone in which it can be subjected to sufficient heat to drive out the solvent. It will be understood that since this composition contains no thermoplastic resin, there will be no curing or polymerization as such. After the sheet has had the solvent driven from it, it is subjected to leaching.

The leaching is accomplished preferably in a continuous manner by passing the separator sheet or strip through an elongated trough or tank on a conveyor, hot water (where the filler is water soluble) passing through the trough in counter current to the product. In actual practice the water as introduced into the tank is at a temperature of substantially 170° to 180° F., its temperature falling to about 120° F. at the outlet. The leaching time may be of the order of 20 to 25 minutes. We endeavor, when the filler is salt to extract until less than 3% remains in the product. A salt content of 3% (about 6 milligrams per square inch) is tolerable in a separator, and will be decomposed when the battery in which the separator is used is "formed."

As has been indicated above, it is advisable to retain in the separators a quantity of the surface-active or wetting agent which has been employed in their manufacture so that the separators will be readily re-wet by the electrolyte when they are put into use. An advantage of the "sulfonated red oil" as well as of certain other non-ionic wetting agents is that while they will not salt out, their solubility is depressed by the quantity of salt dissolved in the leaching bath. Consequently, it becomes possible to control the quantity of the wetting agent remaining in the separators by control of the concentration of the leaching solution. A further factor involved is the temperature of the extracting fluid, since the surface-active agent tends to extract proportionately faster than the salt the lower the temperature of the water. By a proper balancing of these factors it is readily possible to extract the filler to the required extent while leaving a small residual quantity of the surface-active agent in the product. We have not found it possible to determine the required residual quantity; but there should remain in the separator enough of the surface-active agent to make the separator readily rewettable by battery electrolyte after drying.

Modifications may be made in our invention without departing from the spirit of it. Having thus described our invention in certain exemplary embodiments, what we claim as new and desire to secure by Letters Patent is:

1. A process of making separators for electrical accumulators which comprises reducing a soluble filler substance to an average particle size not greater than substantially 40 microns, and compounding from 60 to 85% by volume of said filler with other ingredients comprising a thermoplastic resinous base having a molecular weight not less than substantially 25,000, a surface-active extender-plasticizer, and a volatile solvent, mixing the said ingredients in a blender to form a dry mix, subjecting the dry mix to mechanical working under heat in a closed system in a compounder-extruder to plasticize it, and extruding it in the form of a battery separator sheet, thereafter subjecting the sheet to heat to drive off the solvent, and to a leaching treatment to remove the said filler.

2. The process of claim 1 in which said filler is sodium chloride, and in which said extender-plasticizer comprises "sulfonated red oil."

3. The process of claim 1 in which said filler is sodium chloride, and in which said extender-plasticizer comprises "sulfonated red oil," and in which said resinous base is thermoplastic vinyl resin.

4. A process of making a storage battery separator which comprises providing a thermoplastic resin having a molecular weight in excess of substantially 25,000, said resin being in powdered form, mixing said resin with approximately an equal weight of volatile solvent, about two-thirds its weight of a surface-active extender-plasticizer and at least substantially four times the quantity of all other ingredients, by volume, of soluble salt, homogenizing said ingredients in a blender to form a powdery mix thereof, introducing said powdery mix into an extrusion compounder and subjecting it to intense mechanical action under heat while preventing the escape of solvent therefrom, and extruding the plasticized compound so formed as a sheet of suitable thickness for a storage battery separator, afterward driving out the solvent by heat and leaching the salt and a major portion of the extender-plasticizer therefrom to impart porosity.

5. The process claimed in claim 4 wherein the leaching is accomplished in an elongated trough by water initially at a temperature of substantially 170° to 180° F. flowing in counter current to the separator material.

6. The process claimed in claim 5 in which the temperature and salt content of the leaching water are controlled to leave a small quantity of the surface-active material in the separator.

7. A process of producing separators for electrical accumulators which comprises making a homogenized dry mix of the following ingredients:

| | Parts by weight |
|---|---|
| Thermoplastic vinyl resin | 100 |
| Salt | 1000 |
| High molecular weight aromatic petroleum extract | 30 |
| Solvent | 100 |
| "Sulfonated red oil" | 30 | introducing said dry mix into a compounder-extruder in a closed system and subjecting it to heat, pressure and mechanical working therein, extruding the said composition in the form of a separator sheet, treating the said sheet with heat to remove said solvent, and leaching the said sheet in water to remove the said salt.

8. A storage battery separator consisting of a thermoplastic resinous body having a molecular weight in excess of substantially 25,000 and having a porosity resulting from the incorporation into said body of at least substantially four times the quantity by volume (based on the quantity of all other ingredients combined) of leachable salt, said other ingredients comprising a volatile solvent and a surface-active extender-plasticizer, followed by the removal of substantially all of said salt and other ingredients.

9. The separator claimed in claim 8 containing a small residual quantity of said surface-active extender-plasticizer.

10. The separator claimed in claim 8 when made from the following ingredients in the following proportions:

| | Parts by weight |
|---|---|
| Thermoplastic vinyl resin | 100 |
| Salt | 1000 |
| High molecular weight aromatic petroleum extract | 30 |
| Solvent | 100 |
| Sulfated red oil | 30 |

References Cited in the file of this patent

UNITED STATES PATENTS

| 2,198,889 | Engel | Feb. 13, 1940 |
| 2,400,091 | Alfthan | May 14, 1948 |
| 2,504,208 | Locket et al. | Apr. 18, 1950 |
| 2,542,527 | Honey et al. | Feb. 20, 1951 |

FOREIGN PATENTS

| 565,871 | Great Britain | Dec. 1, 1944 |
| 900,804 | France | July 10, 1945 |